Oct. 27, 1959    H. W. KAATZ    2,910,003
PUMP CONTROL Filed March 11, 1955      3 Sheets-Sheet 1

INVENTOR.
HERBERT W. KAATZ
BY Bosworth, Sessions,
Hershtrom + Lawler
ATTORNEYS

Oct. 27, 1959

H. W. KAATZ

2,910,003

PUMP CONTROL

Filed March 11, 1955

INVENTOR.
HERBERT W. KAATZ
BY Bosworth, Sessions,
Herrstrom & Lawler
ATTORNEYS Oct. 27, 1959     H. W. KAATZ     2,910,003
PUMP CONTROL Filed March 11, 1955     3 Sheets-Sheet 3

INVENTOR.
HERBERT W. KAATZ
BY Bosworth, Sessions,
Herrstrom & Lawler
ATTORNEYS

United States Patent Office 2,910,003
Patented Oct. 27, 1959

2,910,003

PUMP CONTROL

Herbert W. Kaatz, Elyria, Ohio, assignor, by direct and mesne assignments, to The American Crucible Products Company, Lorain, Ohio, a corporation of Ohio Application March 11, 1955, Serial No. 493,631

15 Claims. (Cl. 103—25)

This invention relates to pump controls and in particular to pump controls for automatically actuating and deactuating a pump in response to the level of the liquid to be pumped.

An object of my invention is to provide a pump control responsive to liquid level to actuate and deactuate the pump and responsive to pump discharge or volute pressure to maintain the pump in operation as the level of liquid is changed by the action of the pump, which may be used with pumps having a wide range of discharge heads, but which requires no adjustment to compensate for hydrostatic pressure within the discharge line. More broadly stated one of my objects is to provide a pressure operated pump control responsive to high and low liquid levels for starting and stopping.

It is a further object of my invention to provide a pump control of the non-float type which is responsive only to liquid level to actuate and deactuate the pump and which is free of tendency to "hunt" or actuate undesirably other than at the intended high liquid level.

Another object of my invention is to provide a pump control, responsive to liquid level, as the same is measured by the hydrostatic pressure thereof, to actuate a pump, which may be readily and easily adjusted to actuate the pump at any predetermined practicable and desirable liquid level.

It is a further object of my invention to provide a pump control having a plurality of pressure sensitive members, adapted to respond only to liquid level as the same is measured by the hydrostatic pressure thereof to actuate and deactuate the pump, and to liquid level, as measured by hydrostatic pressure, and pump discharge pressure to maintain the pump in operation as the level of the liquid is changed by the action of the pump.

Another object of my invention is to provide a pump control having a first pressure sensitive member responsive to a first liquid level and a second pressure sensitive member responsive to a second liquid level and to volute pressure.

A still further object of my invention is to provide a pump control having a first pressure sensitive member responsive to a first liquid level to set the control, and a second pressure sensitive member, responsive to a second liquid level to actuate said pump after the control has been set by the response of the first pressure sensitive member, and to volute pressure to maintain said pump in operation as the liquid level is changed, the first pressure sensitive member deactuating the pump when the liquid level is no longer sufficient to cause a response in said first pressure sensitive member.

Another object of my invention is to provide a pump control having two pressure sensitive members, and switch means therebetween, the first of said pressure sensitive members being adapted to respond to a first liquid level and the second of said pressure sensitive members being adapted to respond to a second liquid level and pump discharge or volute pressure, said switch means being actuated only when both pressure sensitive members are in a state of response.

Another object of my invention is to provide a pump control having two pressure sensitive members and two switches connected in series with each other and the motor of a pump, each of said switches being in operative relation with one of said pressure sensitive members, the first pressure sensitive member being responsive to a first liquid level and the second pressure sensitive member being responsive to a second liquid level and to volute or discharge pressure.

It is a further object of my invention to provide a pressure sensitive pump control, responsive to a first liquid level to actuate a pump and to a second liquid level to deactuate a pump, which has only one switch.

It is a general object of my invention to provide a pump control which is simple, efficient, and rugged in operation and simple and compact in design and which is especially useful in submersible pumping systems and in controlling submersible pumps. It is a further object of my invention to provide a pump control, which may be housed within the housing of the pump to be controlled, or within a separate housing which may be secured to the pump housing or connected therewith by suitable pipes and/or conduits.

These and other objects and advantages of my invention will appear from the following description of a preferred embodiment of my invention and modified forms thereof, reference being made to the appended drawings in which.

Figure 1:
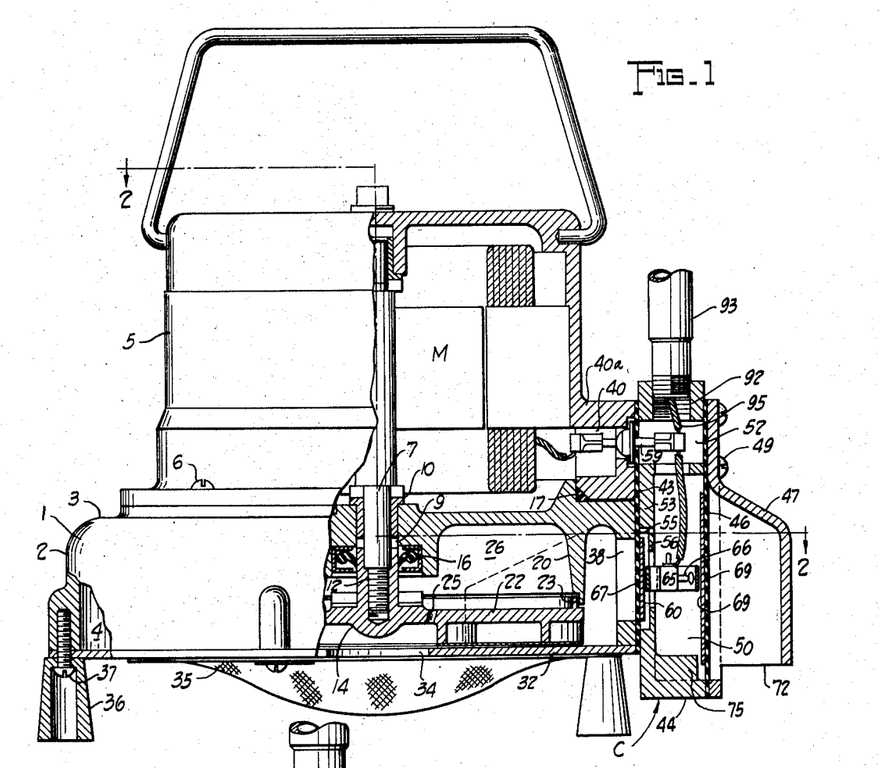
Figure 1 is a partial cut-away vertical section of a submersible pump having a preferred embodiment of my control secured thereto.
Figures 2, 5:
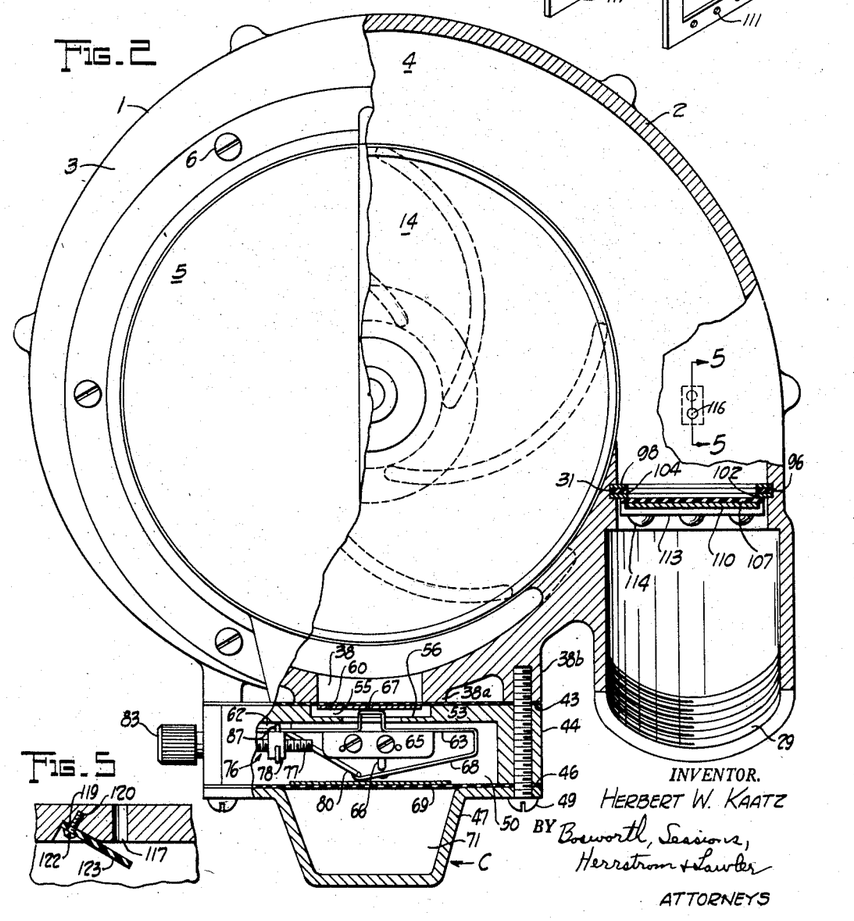
Figure 2 is a partial horizontal section of the pump and control shown in Figure 1 viewed substantially along the line 2—2 of Figure 1.
Figure 5 is a vertical section of the air lock relief valve shown in Figure 2 viewed along the line 5—5 of Figure 2.

Referring now to the drawings and particularly Figures 1 and 2 thereof, a pump control embodying the preferred form of my invention is shown in conjunction with the motor pump unit which it is to control, although it is to be understood that my control may be used with other motor pump units and other motor pump units may be adapted for use with my control and accordingly throughout this application the terms "pump discharge" and "volute pressure" are used synonymously since within limits as will hereinafter more fully appear the value thereof per se is not material.

The motor pump unit shown for present illustration comprises a cast bronze volute chamber housing 1 which forms the sides 2 and top 3 of the volute chamber 4 and to which the cast bronze motor chamber housing 5 is secured by means of screws 6. A motor M is disposed within the motor chamber housing 5. A shaft 7 extends from the motor, through a hollow boss 9 in the volute chamber top 3 into the volute chamber 4, and is supported within the boss by suitable bearings 10. The volute chamber end of the shaft 7 is threaded as at 12 and an internally threaded impeller 14 is secured thereto.

A conventional seal 16, disposed between the impeller 14 and the boss 9, and an O ring or gasket 17, disposed between the volute chamber housing 1 and motor chamber housing 5, prevent liquids from flowing into or out of the motor chamber M.

The impeller 14 conveniently is a concentric closed or shrouded centrifugal impeller and is adapted to be rotated by the motor, when the same is actuated. An annulus 20 is formed integral with the volute chamber top 3. The depending edge of the annulus is spaced slightly from the back shroud 22 of the impeller and is substantially aligned with the outer edge thereof. A labyrinth seal 23 may be provided between the annulus 20 and back shroud 22. Vacuum bleed holes 25 lead from the eye of the impeller through the back shroud to the space 26 above the impeller.

The vacuum bleed holes 25 and labyrinth seal 23 co-operate to permit the partial evacuation of the space 26 without undue reduction of the efficiency of the pump due to excessive recycling of the liquid being pumped across the back shroud and through the vacuum bleed holes. The partial evacuation of the space 26 reduces the downward thrust exerted upon the impeller 14 and consequently upon the bearings 10, aiding pump efficiency pro tanto. The downward thrust which is in part effectively and efficiently relieved by the aforeseaid vacuum bleed holes and labyrinth seal results from the pressure differential, which would otherwise exist across the impeller back shroud 22 during operation of the pump. This pressure differential results from the vacuum which is developed at the eye of the impeller, when it is rotated by the motor. In tests the use of the vacuum bleed holes has reduced the thrust on the impeller by as much as seventy-five percent.

In order to obtain maximum pump efficiency with maximum compactness I prefer that the pump embody a developed volute and that the control be located at or near the smallest part thereof although volutes of other shapes may be used and the control located at any point along the periphery at which sufficient volute pressure is available for the operation of the control in the manner hereinafter set forth. According to my preference the volute housing 1, see Figure 2, is not concentric but rather is of such a shape that the volute, as the same is defined by the side walls 2 of the housing 1 and the outer edge of the impeller 14 and the annulus 20, is an Archemedial spiral. The flow of liquid within the developed volute is from the region of least cross-sectional area to that of greatest cross-sectional area and the same pressure and rate of flow exist at any point along the volute. The volute substantially encircles the impeller and terminates in a threaded discharge outlet 29 to which a suitable discharge pipe may be secured.

A check valve 31, the construction and purpose of which will hereinafter be more fully explained, is preferably provided in the volute just ahead of the discharge outlet.

A bottom plate 32 is secured to the volute housing 1 and defines the bottom of the volute chamber. This plate is provided with an aperture 34 which is concentric with the eye of the impeller 14, and provides means by which the liquid to be pumped reaches the impeller eye. A strainer plate or screen 35 and legs 36 are also provided. Screws 37 secure the bottom plate, strainer plate and legs to the housing.

Figure 3:
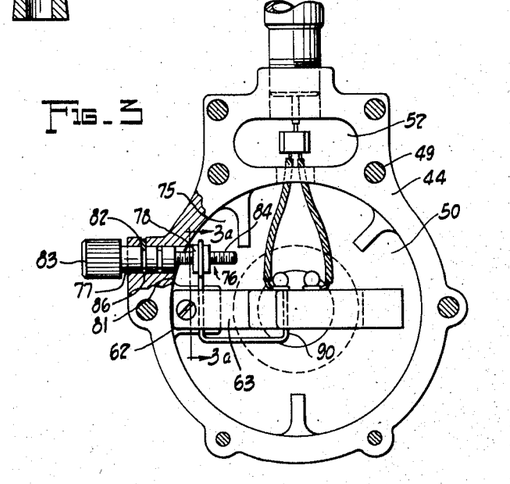
Figure 3 is a side elevation partly in section of the control shown in Figure 1 with the skirt plate and low pressure holding or setting diaphragm removed to show the interior of the control.

Referring now more especially to the control mechanism and structure in the lower right part of Figure 1, the lower middle part of Figure 2 and Figure 3, an aperture 38 is provided in the boss 38a in the side wall 2 of the volute, and provides means by which the pressure within the volute may be communicated therefrom. As explained above for space saving and production reasons, I prefer that this aperture be located near the beginning of the volute. A hollow boss 40a with an aperture 40 is provided on the motor chamber housing 5 and extends therefrom terminating above and in the same vertical plane as the face of the boss 38a.

The pump control C embodying a preferred form of my invention is secured to the pump and motor housings, members 1 and 5, so as to cover, protect, and be in communication with, the apertures 38 and 40. The control comprises a high pressure responsive diaphragm 43, a switch ring 44, a low pressure responsive diaphragm 46, and a skirt plate 47, which are secured to the pump housing by the screws 49 entering tapped holes in the boss 38b which is faced off in the same plane as the faces of the bosses 38a and 40a.

The switch ring 44 is preferably of cast bronze and defines a substantially cylindrical switch chamber 50, see Figure 3, which overlies the aperture 38 and defines a junction box 52 which overlies the aperture 40. The high pressure side of the switch chamber 50 is bounded by the chamber wall 53 adjacent the pump housing. A conveniently cylindrical aperture 55 is formed in the chamber wall 53. The aperture 55 is substantially concentric with the aperture 38 in the volute side wall 2 and is conveniently but not necessarily of slightly larger diameter than the aperture 38. The switch chamber side of the aperture 55 is partially closed by thin, rigid diaphragm stop 56, see Figure 2, which limits the movement of the diaphragm 43 in a manner and for a purpose to be hereinafter more fully described, and which is conveniently formed integral with the wall 53.

The diaphragm 43 which is disposed between the pump housing and the switch ring is conveniently made of a thin sheet of rubber and thus is capable not only of responding by flexing when subjected to pressure but aids in insuring a water tight seal between the pump and the control. The diaphragm is pierced as at 59, Figure 1, to permit necessary electrical leads to pass from the junction box 52 to the motor chamber and is also provided with suitable holes (not shown) through which the bolts 49 may pass. A brass reinforcing disc 60 is secured as by gluing to the switch chamber side of that portion of the diaphragm which overlies the aperture 38. The disc 60 has a diameter smaller than that of the aperture 55 but preferably larger than that portion of the aperture 55 which is not covered by the diaphragm stop 56. The diaphragm 43 is adapted to respond to the pressure existing in the volute (whether hydrostatic pressure and/or pump pressure) and will flex in response to such pressure in a direction toward the switch chamber.

The minimum pressure to which the diaphragm 43 will respond as well as the magnitude of the response to any given pressure is a function of the area of the diaphragm and the resistance against which it acts, and the maximum magnitude of the response of the diaphragm 43 regardless of how great the pressure within the volute may become is determined by the reinforcing disc 60 bearing upon the stop 56, as will hereinafter more fully appear.

The motor control switch 65 is resiliently mounted between the diaphragms 43 and 46 in the chamber 50 to be influenced by either or both diaphragms. A flat boss 62, Figure 3, extends into the switch chamber 50 and lies along the extension of the horizontal centerline of the aperture 55, and is formed as an integral part of the chamber wall 53 and the switch ring 44. A thin elongated metallic spring strip 63 which is adapted to function as a leaf spring is secured to the boss 62. The leaf spring 63 extends horizontally from the boss 62 across the aperture 55 and is of sufficient length to permit a normally open single throw switch 65 to be mounted on the side away from the aperture 55. The switch 65 preferably has, for example, an eight ounce operating force and is mounted with the switch button 66 facing away from the aperture 55. The spring 63 is formed so as to include a U-shaped projection 67 which when the spring is unloaded extends into the aperture 55. The projection 67 extends outwardly from the plane of the spring 63 a distance which is conveniently slightly less than the combined thickness of the wall 53 and boss 62.

The spring is also bent and formed, as at 68, at its unsupported end so as to overlie at least a portion of the switch 65 and to be in operative relation with and interposed between the switch button and the diaphragm 46.

The diaphragm 46 is, also, preferably made of a thin sheet of rubber and is provided with suitable holes through which the bolts 49 extend. This diaphragm is adapted to form the outer or low pressure side wall of the switch chamber 50. Additionally it also ensures a water tight seal between the switch ring 44 and skirt plate 47. A brass reinforcing disc 69 is secured to the switch chamber side of the diaphragm 46 and is conveniently concentric with the switch chamber.

The skirt plate 47 is preferably of cast bronze and is adapted to form the outermost wall of the control. It is provided with holes for the bolts 49 and provides the surface upon which the bolts bear when drawn up. The skirt plate forms and defines the chamber 71 which is closed by the diaphragm 46 on one side and opens downwardly and externally at 72 where pressure existing in any liquid which may stand above the skirt mouth 72 is communicated to, and acts upon the diaphragm 46 so that the diaphragm 46 responds to the pressure or head existing at the skirt mouth 72. The initiation and magnitude of the response depends on the relationship between the pressure or head at the skirt mouth, the area of the diaphragm 46 and the force against which the diaphragm must move. Stops 75, which are conveniently formed integral with the switch ring 44, limit the flexing of diaphragm 46 toward the switch 65 regardless of the pressure exerted. The amount of flexing at least equals the travel of the switch button required to actuate the switch for reasons which appear below. The diaphragm 46 is made, for example, with an area such that a head of about one inch of water above the mouth 72, will cause the diaphragm to make its maximum response and bear against the stops 75 with a force greater than the release force of the switch.

The diaphragm 43, on the other hand, may be of such an area that, when acted upon by a head of about seven inches of water above the level of the mouth 72, for example, will make its maximum response, i.e., will flex against the stop 56, and actuate the switch, unless by means presently to be described motion of the diaphragm 43 is resisted to require a greater head to induce its switch actuating or holding motion.

It should be noted, however, that the areas of the diaphragms and the operating force of the switch, and/or the force of the preloader to be described, may be varied so that either or both diaphragms will make their respective maximum responses to appropriate predetermined pressures. The example hereinbefore given is only used for illustration. I have found it practicable to employ my invention with small pumps having for instance a maximum discharge head of 20 feet of water in which the diaphragm 43 makes its maximum response at from five inches to fifty inches of water head.

As will hereinafter more fully appear, the pressure at which the diaphragm 43 makes its maximum response is effectively a measure of the liquid depth at which the pump will be actuated. The varying uses and conditions under which submersible pumps are used make it desirable that such pumps be easily adjustable so that they may be actuated at any predetermined liquid level and not just at one fixed level. In the past difficulty has been experienced in providing pressure sensitive controls for submersible pumps which could be so adjusted. I therefore prefer that my control embody the novel adjustable preloader indicated generally at 76, Figures 2 and 3. Although I prefer that the preloader be adapted to preload or increase the resistance of diaphragm 43 to flexing, at a range above the aforesaid five inches of water pressure, but less than a level having a pressure equal to the available volute pressure, it should be understood that, in accordance with the aforesaid principles regarding the pressure at which the diaphragm will make a maximum response, diaphragm 43 may be designed to respond to only a nominal liquid level when not preloaded. The minimum liquid level at which diaphragm 43 makes its maximum response may be set at the convenience of the manufacturer, seller or user, it only being desirable that in operation it exceed the liquid level at which the diaphragm 46 will make its maximum response.

Figure 3A:
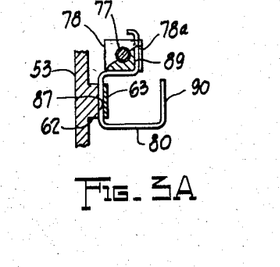
Figure 3a is a fragmentary sectional view taken along the plane of the line 3a—3a in Figure 3.

As best seen in Figures 3 and 3a the preloader includes a bolt 77, a nut 78 and a resilient lever 80, which takes the form of a bent wire for actuation by the nut to exert selected yielding pressures upon the body of the switch 65 toward the diaphragm 43. The bolt 77 is journaled in hole 81 in the switch ring 44 and extends therethrough into the switch chamber 50 and lies substantially parallel to and above the spring 63. The bolt is secured against longitudinal movement by the drift pin 82 coacting with a groove in the bolt and permitting rotation thereof. The external end of the bolt 77 is provided with a knurled and slotted knob 83 and the internal end is threaded as at 84. An O-ring seal 86 in a second groove in the bolt prevents water from entering the switch chamber through the hole 81. The nut 78 is threaded onto the bolt 77 and is restrained from rotation by engagement with the offset end portion 89 of the wire lever 80 and is adapted to move along, rather than rotate with, the threads 84 when the bolt is turned. As suggested in Figure 3a the wire lever 80 is fulcrumed about a vertical axis in a groove 87 in the boss 62 of the wall 53, where it is held under spring 63, and is laterally offset to pass freely under the nut 78 and then the offset end portion 89 extends vertically upward in a groove 78a in the far side of the nut 78 so that longitudinal motion of the nut swings the lever about its axis in the grove 87 and moves the remote end 90 of the lever right and left as viewed in Figure 3a and "up and down" as viewed in Figure 2. Preferably the wire lever is also bent over as well as under the nut 78 to aid in resisting rotation of the nut. The end 90 is spaced from the fulcrum, bent up and disposed vertically between the switch 65 and diaphragm 46, and is adapted to bear adjustably upon the switch button side of the switch, Figure 2. As the nut 87 is moved rightwardly as viewed in Figure 2 the end 90 of the wire lever 80 resiliently urges the switch 65 toward the diaphragm 43 and in opposition to movement of the switch by the diaphragm 43. Rotation of the knob 83 so as to increase the force exerted by the wire upon the switch would increase the resistance to the movement or response of diaphragm 43 and would require that a proportionally larger pressure or head be exerted upon the diaphragm to cause the maximum response thereof. Similarly a rotation of the knob 83 so as to reduce the force exerted upon the switch by the pre-loader will reduce the pressure necessary to cause a maximum response of the diaphragm. Since diaphragm 43 must make a full response before the control actuates the pump, it follows that varying the pressure or head which must act upon the diaphragm to cause a full response is equivalent to varying the liquid level at which the pump will be actuated. My preloader provides a convenient and simple means for adjusting the actuation of the pump to a wide range of liquid levels.

A threaded aperture 92 is provided in the upper wall of the junction box 52. A fitting 93 is screwed into the aperture 92 and a hollow waterproof and preferably sheathed cable (not shown) is secured thereto. Suitable electrical leads 95 extend from a power source, through the cable, fitting, and junction box, and connect the motor and switch 65. The cable provides means for venting the switch chamber to the atmosphere.

In use a motor pump unit having associated therewith a control embodying my invention is placed in a bilge or sump, for example, and connected to a suitable electrical power source. If the bilge is dry the switch 65 will stay open and the diaphragms 43 and 46 repose in their normal unflexed positions. As water collects in the bilge and the level reaches the skirt mouth 72, air is trapped within the skirt in the chamber 71 and exerts a pressure on and causes a response of the diaphragm 46. The diaphragm 46 is preferably of such a size that a water depth of less than one inch above the mouth 72 will cause a maximum response in the diaphragm and will hold the disc 69 and diaphragm 46 against the stops 75 with a force in excess of the release force of the switch; the spring 63, however, permitting the switch 65 to move bodily toward the diaphragm 43 to avoid being closed by the initial motion of the diaphragm 46. The response of diaphragm 46 does, however, "set" the control so that a subsequent determinable maximum response by diaphragm 43 will actuate the pump, such response being delayed by the smaller area of the diaphragm 43, the operating force of the switch, the resistance of the portion 68 of the spring 63 and the preloading imposed by the resilient lever 80.

The liquid level which causes diaphragm 46 to respond also exerts a pressure via the pump intake aperture 34 and the volute on diaphragm 43. The continued rise of water level in the bilge cannot further flex diaphragm 46, as it is already flexed against the stops 75, nor will diaphragm 43 move significantly until the hydrostatic pressure is great enough to cause the diaphragm 43 to make its maximum response against the opposing forces mentioned above. As soon as the liquid level is sufficient to exert such a hydrostatic pressure, in this example seven inches, diaphragm 43 is flexed toward and/or against the stop 56 and simultaneously the disc 60, engaging the bend 67 of the spring 63 moving the switch bodily toward the "set" diaphragm 64, squeezing the contact element 66 therebetween and closing the switch. Thus when both diaphragms have come and been permitted to come to their states of maximum response and all the conditions thereof have been fulfilled the switch is closed and the pump is actuated. Pump actuation at once imposes volute pressure on the diaphragm 43 tending to maintain it in its state of response holding the switch in its closed position. If there should be, under some extreme operating conditions, an increment of time, immediately after actuation of the pump, when the reduction in the level of liquid reduces the hydrostatic pressure acting on diaphragm 43 below that necessary for actuation of the pump before the rising pump pressure compensates therefor the difference between the switch release force and its operating force will hold the switch closed until volute pressure suffices to maintain the closed circuit. Accordingly, so long as the pump is operating and pumping liquid the diaphragm 43 is urged to remain in its state of maximum response against the stop 56.

As the operation of the pump continues, the evacuation of liquid from the bilge continually reduces the level thereof until the hydrostatic pressure thereof exerted on the diaphragm 46 becomes insufficient to oppose the release force of the switch. The switch will then open, and the pump will be deactivated. If, as I find convenient, the switch has a release force which is less than the operating force, the liquid level when the switch opens will be only a small fraction of an inch above the mouth 72 of the skirt. When the pump stops volute pressure falls to that of the hydrostatic head within the bilge and volute chamber. The pump and control are now again ready to repeat the cycle of operation.

The preceding description of the use and operation of my invention did not include the effect and purpose of the check valve 31 on and in relation to my control. My control is capable of being essentially independent of the hydrostatic head of the discharge line, except perhaps if the same is so trivial as to impair the achievement or maintenance of a desirable volute pressure on the diaphragm 43. Additionally, in instances wherein the discharge line has a greater height than the liquid level at which the pump is actuated, there may be some conditions, as when the diameter of the discharge line is greater than the diameter of the intake aperture 34, under which the liquid within the discharge line will flow back into the volute chamber, upon deactuation of the pump, at a faster rate than it can flow from the chamber into the bilge through the aperture 34 with a result that a hydrostatic pressure of sufficient magnitude to re-establish a maximum response of diaphragm 43 may develop. Meanwhile the liquid returning to the bilge would cause the level therein to rise. It is possible therefore in some installations and uses of a pump with a control embodying my invention that the flow of liquid back into the bilge could raise the level of liquid therein sufficient to cause the diaphragm 46 to make a maximum response thereto and exert a force in excess of the operating force of the switch while at the same time the height of liquid in the discharge line could do the same in respect to diaphragm 43. This would result in the pump tending to "hunt," depending on the relationship between, inter alia, the diameter, length and head of the discharge line, the diameter of the aperture 34, the cross-sectional area or volume of the bilge, and the predetermined or preload liquid depth selected to cause a maximum response in diaphragm 43. The diaphragm 43 is preferably determined not with regard to the stated problem of hunting, but with regard to the utility and efficiency of the control as above described.

I have found that the novel check valve 31 effectively protects the control and pump against such possible "hunting" and is otherwise advantageous to the pumping system as by preventing liquid from flowing back out of the discharge pipe when the pump is deactuated.

Figure 4:
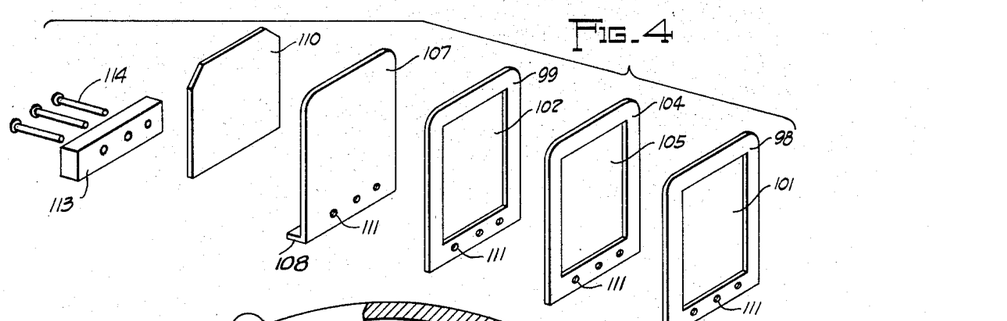
Figure 4 is an exploded view of the check valve shown in Figure 2.

The check valve 31, Figures 2 and 4, is positioned in the volute just prior to the discharge outlet 29. It is adapted to slidably fit into a groove 96 which is provided in the side and top volute walls and to be held therein by the pump bottom cover plate 32. It may therefore be easily replaced by the user if it becomes damaged or worn during use, by simply loosening the screws, removing the bottom plate, sliding the old valve out of the groove 96, placing a new one in the groove and replacing the bottom plate. As best seen in Figure 4, the check valve comprises two brass plates, 98 and 99, which have a periphery of substantially the same shape and size as cross-section of the volute at the bottom of the groove 96. The plates 98 and 99 are provided with aligned central apertures 101 and 102 respectively through which the liquid being pumped is forced. These apertures 101 and 102 are as large as conveniently practicable, so as to present small resistance to the discharge flow. A rubber gasket 104 having substantially the same peripheral shape as the plates 98 and 99 but being adapted to extent slightly beyond the plates 98 and 99 and bottom edgewise in the groove 96 is provided between the said plates and when assembled prevents liquid from flowing around the edges of the check valve. The gasket is, also, provided with an aperture 105, which is in alignment with the apertures 101 and 102 when the check valve is assembled.

A rubber flap 107 provides means for controlling the flow of liquid through the check valve. The flap is located on the discharge side of the check valve and is adapted to permit liquid to flow from the volute to the discharge line but not vice versa. The flap is of sufficient size to cover the aperture 102, and is provided with an angled portion 108 which preferably is bent toward the discharge outlet and under backflow pressure aids in insuring a liquid-tight seal between the valve and the bottom plate 32.

A brass reinforcing plate 110 of greater size than the aperture 102, is secured to the flap 107 as by gluing or vulcanizing. The plate 110 is secured to the discharge side of the flap and is adapted to overlie the aperture 102. The reinforcing plate stiffens the flap and prevents the water trapped in the discharge line, when pumping stops, from forcing the flap 107 through or bulging it into the apertures 101, 102 and 105.

Each of the check valve members 98, 99, 104 and 107 preferably have aligned holes 111, which provide convenient means for assembling the check valve. A small plate 113 having similar aligned holes, overlies a part of the discharge side of the flap 107 and provides a surface upon which the heads of the rivets 114 or other fastening means bear. In operation the flap 107 hinges along a line between the reinforcing plate 110 and draw plate 113.

In those instances wherein my control is used in conjunction with a non-self-priming pump having a check valve, the rising liquid could trap air in the volute and tend to prevent water from entering the volute to a sufficient depth to prime the pump. Thus although the control would function to actuate the pump the pumping action might be impaired. To prevent such air lock and insure that the pump will prime and pump liquid when actuated, I provide an air lock relief valve 116 in the volute wall, Figures 2 and 5. This valve is preferably situated in the uppermost part of the wall of the volute just ahead of the check valve 31.

As best seen in Figure 5 the air lock relief valve comprises a small hole or air vent 117 drilled through the top of the volute chamber housing 1. The volute wall is machined as at 119 to form a seat which is upstream of the air vent with respect to liquid flowing through the volute, and at an angle with the volute wall. A second hole 120 is drilled and tapped in the face 119 and housing. The hole 120 is on the upstream side of the hole 117 and is adapted to receive screw 122 which secures the rubber valve member or flap 123 to the housing. The valve member or flap is adapted to cover the air vent 117 when subjected to the force of flowing liquid in the volute. The flap 123 when under no pressure, or in equilibrium, will extend into the volute in a plane parallel with the face 119 and will not close the air vent 117. Thus rising liquid will force air which would otherwise be trapped in the volute through the vent 117 and the liquid will be enabled to flow into and fill the volute chamber insuring that the pump will be primed. The air vent 117 alone would be sufficient to prevent air lock, but it would also permit liquid to escape from the volute during operation of the pump thereby unnecessarily reducing the efficiency of the pump. The flap 123 closes the air vent during operation of the pump and prevents this loss; liquid, flowing within the volute when the pump is operating, acting upon the flap 123 and bending it, so that it seals the air vent 117.

Figure 6:
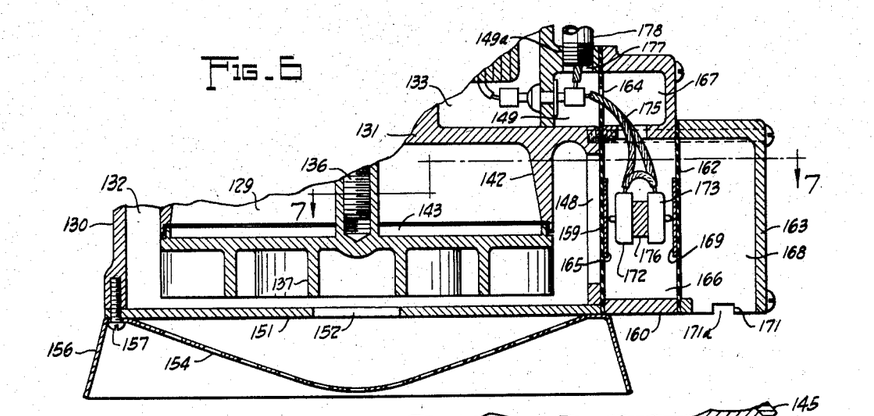
Figure 6 is a vertical section of a pump control embodying a modified form of my invention and a portion of the pump which it is to control.
Figure 7:
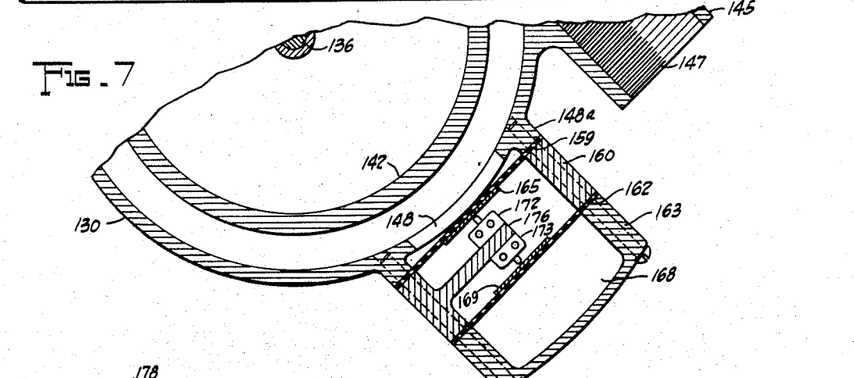
Figure 7 is a horizontal section of the control of Figure 6 viewed along the line 7—7 of Figure 6.

A control embodying an alternate form or modification of my invention together with a submersible pump which is to be controlled thereby is shown in Figures 6 and 7. The modified control is shown for illustration in conjunction with a pump having a non-Archemedian volute and a cast housing, although it is to be understood that this control can be used with other pumps and other pumps could be adapted for use with this control.

Referring to Figure 6 the pump comprises a housing 130 and a dividing wall 131 which forms, inter alia, a pump chamber 129, a volute chamber 132 and a motor chamber 133. A motor is mounted within the motor chamber and a shaft 136 extends therefrom through an aperture, in the dividing wall, with suitable bearings and seals into the pump chamber. A back shrouded centrifugal impeller 137 adapted to be rotated by the shaft is secured to the shaft. An annulus 142 is formed integral with the dividing wall 131 and extends downwardly between the pump chamber and the volute chamber terminating adjacent the periphery of the back shroud 143, of the impeller, and having its outermost cylindrical surface in substantial alignment with the outer circumference of the impeller. A discharge outlet 145 (Figure 7) is provided in the volute chamber wall and is conveniently provided with internal threads 147, to which a discharge pipe (not shown) may be secured.

An aperture 148 is provided in the volute chamber wall within an external circular boss 148a and an aperture 149 within the hollow boss 149a communicates with the motor chamber. The outer faces of the bosses are finished in the same plane to receive the control structure and mechanism.

A bottom plate 151 having an inlet aperture 152, through which the water to be pumped reaches the impeller, forms the bottom of the pump chamber and volute chamber. A strainer plate 154 prevents debris and solid matter from reaching the impeller. Legs 156 which may be conveniently formed integral with the strainer plate support the motor pump unit and bolts 157 secure the bottom and strainer plates to the pump housing.

A control embodying this modified form of my invention is preferably adapted to be secured to the pump housing so as to cover the apertures 148 and 149, although it too may be housed entirely within the pump housing or within a separate housing of its own, in which instance it would be interconnected with the pump and motor unit by means of suitable pipes and/or conduits. A control embodying this modified form of my invention comprises a high pressure sensitive diaphragm 159, a switch ring 160, a low pressure sensitive diaphragm 162 and a skirt 163. The high pressure diaphragm conveniently overlies both the apertures 148 and 149 and functions as both a gasket and diaphragm in the same manner and for the same purpose as the diaphragm 43, in the preferred form of my invention. The diaphragm 159 is provided with a hole 164 which permits communication through the diaphragm to the motor chamber. Additionally a reinforcing disc 165 is secured to the switch ring side of the diaphragm, substantially concentric with the aperture 148.

This control also comprises a switch ring 160 which defines a switch chamber 166 and a junction box 167 in communication with each other. The switch chamber overlies the aperture 148 and the junction box overlies and is in communication with the aperture 149. The diaphragm 159 forms a movable pressure sensitive wall between the volute chamber 132 and the switch chamber 166. The low pressure diaphragm 162 functions in substantially the same manner and for substantially the same purpose, as the diaphragm 46 in the preferred form of my invention. It forms a pressure sensitive partition between the switch chamber 166 and the chamber 168 within the skirt 163, and is the means by which pressures existing in the skirt chamber are translated to motions within the switch chamber. A reinforcing disc 169 is secured to the switch chamber side of the diaphragm 162.

The skirt plate 163 and diaphragm 162 define the downwardly opening chamber 168. The chamber 168 functions in the same manner and for the same purpose as the chamber 71 in the preferred form of my invention. The chamber 168 is shown with a serrated bottom edge 171, which aids in preventing debris, often found in the liquid to be pumped, from closing the downwardly facing and opening mouth 171a of the skirt chamber.

Two normally open single throw switches 172 and 173, are fixedly disposed within the switch chamber and are in operable relation with and operable by the diaphragms 159 and 162, respectively. Suitable leads 175 connect the switches 172 and 173 and motor in electrical series with each other and with a power source. When, as I prefer, the diaphragms 159 and 162 are disposed in axial alignment, the switches 172 and 173 may conveniently be mounted in coaxial alignment therewith on a boss 176 which is formed integrally with the switch ring and extends therefrom into the middle of the switch chamber. I prefer, by way of example, that the switch 173 have a small operating force of about two ounces and that the diaphragm 162 which is adapted to actuate and deactuate the switch 173 have an effective area of about four square inches. When so constructed the switch 173 would be actuated by a pressure of only 1/32 p.s.i. on the diaphragm, or less than an inch of water head above the mouth 171a of the chamber 168.

On the other hand, I prefer that the switch 172 have an operating force of about eight ounces and the diaphragm 159 which is adapted to actuate and deactuate the switch 172 an effective area of about two square inches. Under such circumstances a pressure of four ounces p.s.i. on the diaphragm 159, or about seven inches of water head would actuate the switch. These ratios may be varied without departing from the scope of this modification of my invention, it being only necessary that the diaphragm 162 and switch 173 be adapted to respond to a lower pressure, and therefore lesser head, than the diaphragm 159 and switch 172.

A threaded aperture 177 is provided in the boss 149a and a fitting 178 secured therein. A waterproof conduit is secured to the fitting 178 and provides means by which the electrical leads 175 may reach a power source, as well as to provide a breather tube to the switch chamber.

In use a control embodying this modification of my invention and the associated motor-pump unit may be placed in a bilge or sump, for example, and connected to a suitable electrical power source and with a discharge line leading up and out of the bilge. The switches and diaphragms, which have the characteristics hereinbefore stated to be desirable, may be assumed to be in their "normal" open and unstressed states respectively. As water collects in the bilge the level thereof rises first to the mouth 171a of the skirt chamber 168, air is trapped within the skirt chamber and compressed in proportion to the increasing head of water in the bilge. When the water has risen above the mouth of the skirt to a sufficient height (for example less than one inch) to exert a hydrostatic pressure on the air within the skirt chamber and the diaphragm 162, sufficient (one-half ounce) to actuate the switch 173, the same will be closed. However, the motor is not actuated thereby and pumping does not commence, as the switch 172 remains open, since the diaphragm 159 although acted upon by substantially the same hydrostatic pressure, will not respond thereto. Water continues to collect in the bilge and as its level rises, it exerts an increasing hydrostatic pressure on both diaphragms. Added pressure on diaphragm 162 merely augments its tendency to hold switch 173 closed. Diaphragm 159, on the other hand, is not sufficiently urged from its normal idle position to close switch 172 which remains open until the water rises to a depth sufficient (in this example seven inches) to exert a static pressure (four ounces) sufficient to flex diaphragm 159 against the resistance of switch 172. When this water level is reached, switch 172 is closed, and as switch 173 is also closed, the circuit is completed, and the motor is actuated and pumping commences. An immediate and continuing reduction of the water level within the sump results therefrom. However, as with the preferred embodiment of my invention, the diaphragm 159 remains in a state of response after the level is reduced below that which exerts a pressure equal to the release force of the switch 172, because of the volute pressure, substantially in excess thereof will have been imposed upon the diaphragm 159. The pump continues to operate and evacuate water until the level thereof becomes less than the level necessary to exert a hydrostatic pressure on diaphragm 162 equal to the release force of switch 173. As switch 173 is influenced only by hydrostatic pressure on diaphragm 162, it will thereupon open upon this condition, breaking the circuit and deactuating the motor and pump. The values given above by way of example suggest that the switch will desirably open when liquid level in the sump is a small fraction of an inch above the mouth 171a of the skirt chamber. The volute pressure will thereby be terminated, reducing the pressure acting upon the diaphragm 159 below that necessary to oppose the release force of the switch 172, which will thereupon open, and the pump and control will be ready to repeat the cycle.

Figure 8:
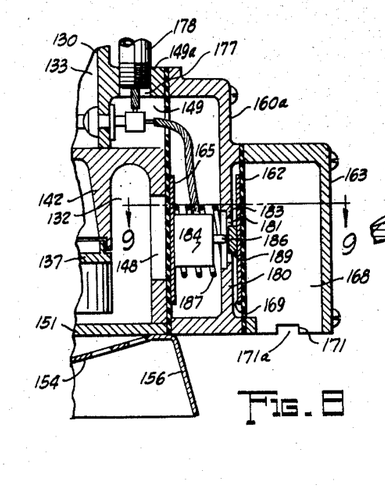
Figure 8 is a horizontal section of a pump control embodying another modified form of my invention and a portion of the pump which it is to control.
Figure 9:
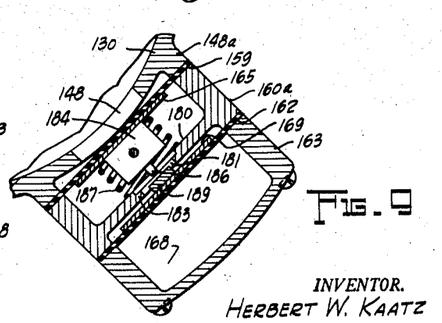
Figure 9 is a horizontal section of the control of Figure 8 viewed along the line 9—9 of Figure 8.

Another modification of my invention is embodied in the control shown in Figures 8 and 9, conveniently in association with a pump similar to that shown in Figures 6 and 7, and the same reference characters are used for the same parts.

This modified control is secured to the pump housing so as to cover the apertures 148 and 149 as above described in reference to the preceding form. In this modified control the high pressure diaphragm 159, reinforcing disc 165, low pressure diaphragm 162, reinforcing disc 169, skirt 163, skirt chamber 168, serrations 171 and skirt mouth 171a are similar to and function in the same manner and for the same purposes as the similarly identified parts of the control shown in Figures 6 and 7.

The switch ring 160a (Figures 8 and 9) is substantially similar to the switch ring 160 (Figures 6 and 7); the ring 160a is, however, formed with a plate or stop 180 instead of the boss 176. The plate 180 is provided with a rectangular hole 181 having a shoulder 183 which is aligned with the diaphragms 159 and 169 and with switch 184. The switch 184 is a normally open single throw switch, which is mounted on the reinforcing disc 165 so that its plunger 186 extends toward the diaphragm 162. The switch 184 moves or responds with the diaphragm 159, increasing pressures on diaphragm 159 causing increasing displacement of the switch toward the diaphragm 162. The shoulder 183 functions as a stop and limits the displacement of the switch and the response of the diaphragm 159 irrespective of the maximum pressure applied to the diaphragm 159.

A spring 187 is disposed about the switch 184 and seats upon the plate 180 and bears on the reinforcing disc 165. The spring functions to positively return the diaphragm 159 and switch 184 to their normal inoperative position when the motor is deactuated. Additionally, as the diaphragm 159 must respond against the force of the spring, as well as the operating force of the plunger 186, the liquid level at which the pump will be operated will, in part, be determined by the strength, rate, precompression, etc. of the spring and may be adjusted during manufacture or use by the selection of an appropriate spring or springs or the use of an adjustable spring.

The plate 180, also, limits the maximum response of the diaphragm 162, a button or projection 189 is secured to the reinforcing disc 169 and is adapted to contact and operate the switch plunger 186 when both diaphragms are respectively subjected to pressures sufficient to cause respective maximum responses and the respective exertion of combined forces in excess of the operating force of the plunger and spring 187.

The operating cycle of this modified form of my invention is similar to that of the preferred or first described modified form of my invention. The diaphragm 162 will respond to the static pressure of a predetermined minimum liquid level by flexing against the plate 180, causing the button 189 to extend through the hole 181 and be resistant to a force greater than the operating force of the switch 184, which however will not actuate the switch until the switch has been displaced toward the button by the subsequent response of the diaphragm 159 when the head thereupon attains a predetermined value. The diaphragm 159 will respond (against the resistance of the spring and operating force of the switch) to the static pressure or head of a predetermined maximum liquid level to displace the switch, and to press the plunger 186 against the button 189 with sufficient force to actuate the switch and thereby the pump. The volute pressure will then exert a greater pressure on the diaphragm 159 than the initiating static pressure and the pump will remain actuated until the static pressure acting upon diaphragm 162 is no longer sufficient to maintain the diaphragm 162 responded against the release force of the plunger 186. The switch will thereupon deactuate, stopping the pump.

A suitable preloader as above described may, also be provided for controls embodying either of the above described second and third modified forms of my invention, and the same considerations regarding check and air lock relief valves would apply to pumps having associated therewith controls embodying either modified form of my invention as to pumps having associated therewith the control embodying the preferred form of my invention.

In the specific examples given above those skilled in the art will recognize that I have assumed volute pressures obtaining during pumping operation of pumps controlled by my invention to be not substantially less than the maximum static head intended to initiate pump actuation. In practice I have found this condition naturally and usually obtainable. Should an exceptional case arise my present teaching would be to raise the volute pressure to substantially equal the desired maximum pump actuation initiating static head as by restricting pump discharge orifice or otherwise as might be found practicable under such an assumed condition.

Modifications, changes and improvements to my invention may occur to those skilled in the art all within the teaching and precepts hereof, and I do not wish to be limited in the scope of my patent to the precise embodiments and modifications herein particularly illustrated and described nor in any manner inconsistent with the progress by which my invention has promoted the art.

I claim:

1. A pump control for actuating and deactuating a motor driven pump, said control comprising switch means for opening and closing the motor circuit and a plurality of pressure sensitive means for actuating said switch means, one of said pressure sensitive means being in communication with the liquid to be pumped and being adapted to respond to liquid level to predispose the control for potential actuation of the pump by the second of said pressure sensitive means and to deactuate said pump, the second of said pressure sensitive means being in communication with the discharge side of said pump and the liquid to be pumped, means for biasing said second pressure sensitive means relative to said first pressure sensitive means to be less responsive than said first pressure sensitive means to the same liquid level, and means preventing said first pressure sensitive means from effectively closing the motor circuit by its sole response to said liquid level, said second pressure sensitive means being responsive to a first liquid level to actuate said switch means to close the motor circuit and being responsive to pump discharge pressure to maintain the circuit closed, said first pressure sensitive means actuating said switch means to open the motor circuit at a second liquid level.

2. A pump control for a pump having a volute, said control comprising switch means for actuating and deactuating said pump and first and second pressure sensitive diaphragms for actuating said switch means, said first diaphragm being in communication with the liquid to be pumped exteriorly of said pump and being adapted to respond to the static pressure thereof, said second diaphragm being in communication with the pump volute and being adapted to respond to the static pressure of the liquid to be pumped and to pump volute pressure, means biasing said second diaphragm to be less responsive than said first diaphragm to the same liquid level, said diaphragms conjointly actuating said switch means to actuate said pump at a predetermined liquid level, said first diaphragm actuating said switch to deactuate said pump at a lower liquid level.

3. A liquid level control for a pump comprising spaced, oppositely acting pressure sensitive responsive means, one said pressure sensitive means being in communication with and responsive to the liquid to be pumped and the other said pressure sensitive means being in communication with and responsive to the pump discharge and the liquid to be pumped, said one pressure sensitive means responding to a lower liquid level than said other pressure sensitive means; pump actuating means carried by one of said pressure sensitive means and in operable relation with and movable relative to the other of said pressure sensitive means, said pump actuating means being operable by the concurrent response of said pressure sensitive means and being rendered inoperable by the non-response of one of said pressure sensitive means.

4. A pump control, adapted to actuate and deactuate a pump having a volute, comprising a switch chamber, spaced first and second pressure sensitive diaphragms having two sides and forming portions of the opposite walls of said switch chamber, the side of said first diaphragm remote from said second diaphragm being in communication exteriorly of the pump volute with the liquid to be pumped, the side of said second diaphragm remote from said first diaphragm being in communication with the pump volute, a leaf spring resiliently mounted at one end within said switch chamber and extending between said diaphragms and having first and second diaphragm contacting means formed integrally therewith and being disposed in operable relation with said first and second diaphragms respectively and being adapted to contact and transmit the responses of said first and second diaphragms, respectively, a switch mounted on said spring and being operable thereby and having operating and release forces, said spring actuating said switch when said first and second diaphragm contacting means are acted upon by said first and second diaphragms respectively with a force exceeding said switch operating force, said first diaphragm having a greater response to hydrostatic pressure of a given liquid level than said second diaphragm, and means disposed within said chamber for limiting the switch actuating movements of said diaphragms, spring and switch whereby said control is adapted to actuate said pump at a predetermined first liquid level and to deactuate said pump at a predetermined second and lower liquid level and to maintain said pump actuated while the level of the liquid to be pumped is lowered by the operation of the pump from said first liquid level to said lower liquid level.

5. The pump control according to claim 4 with a preloader, said preloader being disposed in operable relation with said second diaphragm, a first portion of said preloader yieldably opposing the response of said second diaphragm toward said first diaphragm, a second portion of said preloader extending without said switch chamber and being operatively related with said first portion whereby the force with which said first portion opposes the response of said second diaphragm may be adjusted.

6. The control according to claim 5 in which said preloader comprises a bolt, a nut and a bearing wire, said bolt extending through the wall of said switch chamber and into said switch chamber and having means external of said chamber for rotating said bolt and a threaded portion within said switch chamber, said bolt being adapted to have rotational but not lineal movement, said nut being mounted on said threaded portion of said bolt and being adapted to move lineally along said bolt when said bolt is rotated, said bearing wire having one end secured to said nut, a mid portion fulcrumed within said chamber and the other end adapted to bear upon said second diaphragm contacting means of said spring to resiliently oppose the response of said second diaphragm toward said first diaphragm, said bolt upon rotation positioning said nut and thereby said other end of said bearing wire relative to said second diaphragm contacting means whereby to vary the opposition to the response of said second diaphragm.

7. A pump control adapted to actuate and deactuate a pump, said control comprising a first pressure sensitive member being in communication with the liquid to be pumped and being adapted to respond by displacement to the pressure of a first liquid level, a second pressure sensitive member being in communication with the liquid to be pumped and the discharge side of the pump and being adapted to respond by displacement to the pressure of a second liquid level and the pressure created by the operation of the pump, and switch means disposed in operative relation with said pressure sensitive members and being closed to actuate said pump and maintain said pump actuated by the simultaneous displacement of both said pressure sensitive members, said switch means being displaceable bodily relative to one said pressure sensitive member by the other said pressure sensitive member.

8. The control of claim 7 with stop means disposed in operable relation with said other pressure sensitive member for limiting the displacement of said other pressure sensitive member and said switch means.

9. The control of claim 7 with resilient resistance means disposed in operable relation with a said pressure sensitive member for yieldably resisting the displacement bodily of said switch.

10. The control of claim 9 with means in operable engagement with said resilient resistance means for adjustably biasing the yielding resistance to the displacement bodily of said switch.

11. A pump control adapted to actuate and deactuate a pump having a volute, said control comprising opposed, spaced first and second pressure sensitive diaphragms and switch means disposed between said diaphragms and in operative relation with said diaphragms, said first diaphragm being in communication with the liquid to be pumped exteriorly of the pump and being adapted to respond to the pressure of a first liquid level by displacement toward said second diaphragm, said second diaphragm being in communication with the pump volute and being adapted to the pressure of a second liquid level and to pump operating pressure by displacement toward said first diaphragm, said switch means having operating and release forces opposing the responsive displacement of said diaphragms and being adapted to actuate said pump when said first and second diaphragms are displaced in response to said first and second liquid levels respectively and respectively exert a force greater than said operating force to maintain said pump actuated when said first and second diaphragms are displaced in response to said first liquid level and said pump operating pressure respectively and respectively exert a force greater than said release force and to deactuate said pump when said first diaphragm exerts a force less than said release force in response to the pressure of the liquid to be pumped.

12. A pump control adapted to actuate and deactuate a pump and comprising first and second opposed substantially axially aligned and spaced pressure sensitive diaphragms adapted to displace relative to each other in response to respective pressures, a spring disposed between said diaphragms and in operable relation with said diaphragms to oppose the displacement thereof, a switch disposed between said diaphragms and having an actuating member operable by the simultaneous displacement of both said diaphragms, said switch being adapted to be displaced bodily toward one of said diaphragms by the displacement of the other of said diaphragms and stop means for limiting the displacement of said one diaphragm toward said other diaphragm.

13. A pump control adapted to actuate and deactuate a pump and comprising first and second pressure sensitive diaphragms adapted to be displaced toward each other and a switch mounted on one of said diaphragms on the side thereof toward the other diaphragm, said switch being adapted to actuate said pump when both said diaphragms are displaced toward each other, said first diaphragm being in communication with and responsive by displacement toward said second diaphragm to the hydrostatic pressure of a first liquid level to set the control without actuating said switch, said second diaphragm being in communication with and responsive after said control is set by displacement toward said first diaphragm to a second liquid level to actuate said switch and to pump discharge pressure to maintain said switch actuated, said switch deactuating said pump when the liquid level is reduced by the operation thereof to approximately said first liquid level, said control also comprising stop means in operable relation with said one diaphragm for limiting the displacement of one diaphragm and said switch in the direction tending to actuate said switch.

14. A pressure responsive pump control adapted to actuate and deactuate a pump having a volute, said control comprising a switch chamber, opposed spaced and aligned first and second pressure sensitive diaphragms forming a portion of the walls of said switch chamber and a switch having an operating force, the side of said first diaphragm remote from said second diaphragm being in communication with the exterior of the pump and the side of said second diaphragm remote from said first diaphragm being in communication with said volute, said first diaphragm being adapted to respond, by displacement toward said second diaphragm, to the hydrostatic pressure of the liquid to be pumped, said second diaphragm being adapted to respond by displacement toward said first diaphragm to the hydrostatic pressure of the liquid to be pumped and to volute pressure, said switch being mounted on said second diaphragm on the side thereof toward said first diaphragm and being adapted to be displaced by the displacement of said second diaphragm, a first stop to limit the displacement of said second diaphragm and said switch toward said first diaphragm, a spring disposed within said chamber and in operative engagement with the side of said second diaphragm facing toward said first diaphragm and being adapted to resiliently oppose the displacement of said second diaphragm, a second stop to limit the displacement of said first diaphragm toward said second diaphragm, said diaphragms actuating said switch when both said diaphragms are displaced toward each other with a force greater than said switch operating force, said first diaphragm responding to a first liquid level by displacing toward said second diaphragm and exerting a force greater than said switch operating force to set said control and said second diaphragm responding to a second and greater liquid level by displacing toward said first diaphragm and exerting a force greater than said operating force to actuate said switch.

15. A pump control adapted to actuate and deactuate a pump, said control comprising a switch chamber, first and second pressure sensitive diaphragms forming portions of the wall of said chamber and first and second switches disposed within said chamber and in operable relation with said first and second diaphragms respectively and being connected in electrical series with each other and said pump, said first diaphragm being in communication with and adapted to respond to the static pressure of the liquid to be pumped to actuate said first switch, said second diaphragm being in communication with and adapted to respond to the hydrostatic pressure of the liquid to be pumped and to volute pressure to actuate said second switch, said first diaphragm responding to a lower liquid level to actuate said first switch than the liquid level to which said second diaphragm responds to actuate said second switch, said volute pressure being of greater order than the static pressure at which said second diaphragm actuates said second switch.

References Cited in the file of this patent

UNITED STATES PATENTS

| | | |
|---|---|---|
| 2,479,616 | Hasselhorn | Aug. 23, 1949 |
| 2,488,506 | Bernhardt | Nov. 15, 1949 |
| 2,635,546 | Enyeart et al. | Apr. 21, 1953 |
| 2,687,693 | Hudson | Aug. 31, 1954 |
| 2,715,367 | Kodet et al. | Aug. 16, 1955 |
| 2,741,991 | Disbrow | Apr. 17, 1956 |
| 2,743,673 | Kaatz et al. | May 1, 1956 |
| 2,787,960 | Wightman | Apr. 9, 1957 |
| 2,804,516 | Staak | Aug. 27, 1957 |